Figure 1:
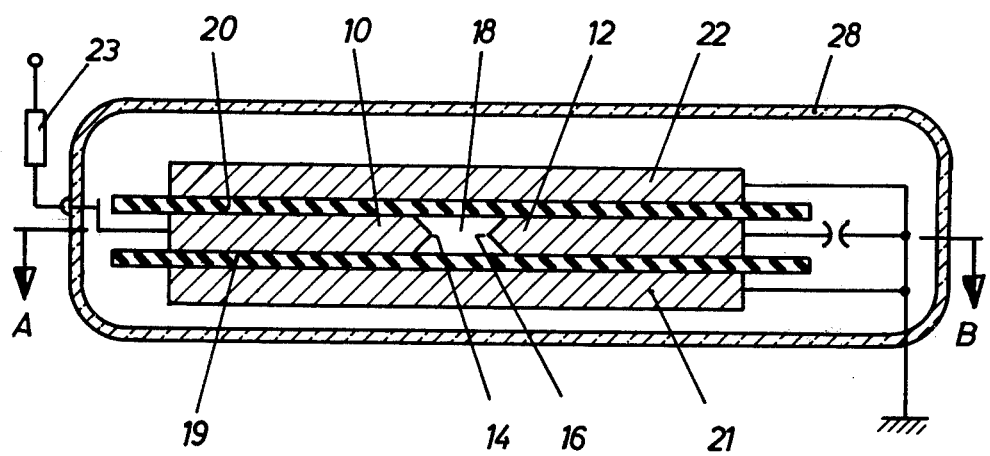

United States Patent [19]

Salzmann et al.

[11] 4,166,252
[45] Aug. 28, 1979

[54] LASER WITH TRAVELLING WAVE EXCITATION

[76] Inventors: Hans Salzmann, Relenbergstrasse 57, 7000 Stuttgart 1; Herbert Strohwald, Vogelsangstrasse 12, 7031 Holzgerlingen, both of Fed. Rep. of Germany

[21] Appl. No.: 694,661

[22] Filed: Jun. 10, 1976

[30] Foreign Application Priority Data

Jun. 24, 1975 [DE] Fed. Rep. of Germany ....... 2528174

[51] Int. Cl.² ............................................ H01S 3/097
[52] U.S. Cl. ........................ 331/94.5 PE; 331/94.5 D; 331/94.5 G
[58] Field of Search ..................... 331/94.5 G, 94.5 D, 331/94.5 PE

[56] References Cited

U.S. PATENT DOCUMENTS

| | | | |
|---|---|---|---|
| 3,729,689 | 4/1973 | Godard et al. | 331/94.5 PE |
| 3,757,248 | 9/1973 | Small | 331/94.5 PE |

OTHER PUBLICATIONS

Herden, "Compact . . . Subnanosecond Nitrogen . . . Lasers . . . ", *Physics Letters*, vol. 54A, No. 1, Aug. 11, 1975, pp. 96–98.

Bergmann, "uv TEA Laser with 760-Torr $N_2$", *Applied Physics Letters*, vol. 28, No. 2, Jan. 15, 1976, pp. 84–85.

*Primary Examiner*—William D. Larkins
*Attorney, Agent, or Firm*—Holtz, Goodman & Woodward Frishauf

[57] ABSTRACT

A pair of elongated electrodes are located in a common plane, separated from each other by an elongated gap. A gaseous medium capable of being stimulated to emit radiation by laser action is located in the gap. A discharge between the electrodes is initiated at a predetermined position by a pumping means which also produces an electrical field which decreases uniformly and monotonically from said predetermined position as the distance from this position increases, such that the discharge formative lag time increases uniformly and monotonically from said predetermined position. The variation in electrical field strength, and thus the formative time lag, can be obtained, for example, by forming the gap to be wedge-shaped, by changing the pressure of the gaseous medium with respect to the length of the gap by introducing gas flow along the length of the gap by shaping the edges of the electrodes to be more pointed at the predetermined position and to have an increasing radius of curvature, by the addition of an electrical and/or magnetical field, or the like. The discharge can be initiated by a spark gap located in the same vessel as the electrodes.

7 Claims, 2 Drawing Figures

LASER WITH TRAVELLING WAVE EXCITATION

Literature references:
(1) H. Salzmann, H. Strohwald, Optics Comm. 12 (1974), 370;
(2) Appl. Phys. Lett. 10 (1967), 3;
(3) IEEE J. Quantum Electronics, QE-10 (1974), 147;
(4) Opto-electronics 4, (1972), 43; and
(5) Appl. Phys. Lett. 25 (1974), 703.

The present invention relates to a laser with two electrodes which are so arranged that they define a gap between themselves which is elongated; a gaseous medium which can be stimulated to emit radiation by laser action is located in the gap. The stimulation of the medium in the gap is so arranged that it propagates in the form of a travelling wave lengthwise of the gap.

Travelling wave stimulation of a laser relates to a way of pumping a laser in which a condition or state in which the stimulatable, active laser medium amplifies the laser radiation is transported together with the laser radiation impulse to be amplified. It is important to stimulate high-power, super-radiating lasers by a travelling wave stimulation in order to obtain effective pumping action, particularly if the propagation time of the laser radiation pulse through the active medium is longer than the duration of the emitted laser radiation pulse. The duration of the laser radiation pulse decreases in gaseous media as the pressure increases due to pulsed damping of the upper range of the laser. For example, a nitrogen laser of a wave length of 337.1 nm has at a filling pressure of 1 atm a pulse duration of $\leq 500$ psec which is short with respect to the transit time through a laser channel of customary length, for example of about 50 cm. In this connection, see literature reference (1).

It has previously been attempted to force travelling wave stimulation by an electrical travelling wave obtained by the propagation time effects of an electrical transit wave, see, for example, the literature references. A problem which has not been satisfactorily solved when stimulating a laser by a travelling wave is that it is practically very difficult to make the rise of electrical voltage between the electrodes so steep that the ignition trigger delay time is short enough in order to maintain equalizing effects along the electrodes within tolerable limits.

It is an object of the present invention to provide for effective travelling wave stimulation of a laser in spite of relatively slow rise time of the stimulation, or, respectively, the electrical high voltage which effects the discharge or the stimulation of the laser.

Subject matter of the present invention:

Briefly, the laser is arranged to have a pair of elongated electrodes located in an essentially common plane and separated from each other by an elongated gap. A pumping means produces an electrical field which decreases uniformly and monotonically from a predetermined position as the distance from the position increases, such that the discharge formative lag time increases uniformly and monotonically from said predetermined position. The location of the predetermined position can be selected, for example by slightly narrowing the gap at that point, by introducing an extraneous field, change in pressure of the gaseous medium, or the like. The gap may be narrowed, for example, by arranging the electrodes so that the gap is slightly tapering, or the edges of the electrodes facing each other have increasing radii of curvature as their distance from the predetermined position increases.

In a preferred form of the invention, the gap continuously widens, starting from a point of minimum width. In its simplest form, the gap is wedge-shaped and defined by the edges of the electrodes which diverge slightly. One or both of the edges of the electrodes can be bowed away slightly from the other. Discharge will then be initiated at the point of shortest distance and will propagate in a direction with increasing electrode distance. The edges can be sharp, can be pointed towards each other, or may be rounded.

Change in the electrical field strength and thus of the formative time lag can be obtained in various other ways; for example, the pressure gradient in the gaseous medium may change; in another form, the electric field strength, and thus the formative time lag of the laser-active medium itself can be affected, for example by addition of an auxiliary gas, the addition of which decreases along the length of the gap, or ceases entirely, as the distance from the predetermined discharge position increases.

The laser can be stimulated to travelling wave emission without use of extremely low inductive switches, such as dielectric spark discharges. Such dielectric spark discharges cannot be used with a high repetition rate. The travelling wave stimulation can be obtained along the length of a channel of a laser of customary dimension, that is, for example in the order of about 50 cm. By travelling wave stimulation of gases which are under pressures above atmospheric, ultra-short laser pulses of high power can be obtained.

In accordance with a feature of the invention, a triggered spark gap to apply high voltage to the electrodes can be included in the same, or in a communicating pressure vessel which also surrounds the electrodes, so that essentially the same pressure will obtain between the electrodes of the laser as well as between the electrodes of the triggered gap. Thus, the laser channel will always be operated with the same ratio of electrical field strength to filling pressure upon changes in pressure in the laser channel, since the trigger voltage of the triggered gap rises with pressure. Thus, the laser can be operated with different fill pressures without changes of the triggered spark gap; the duration of the emitted laser radiation pulse can thus be easily controlled.

Figure 2:
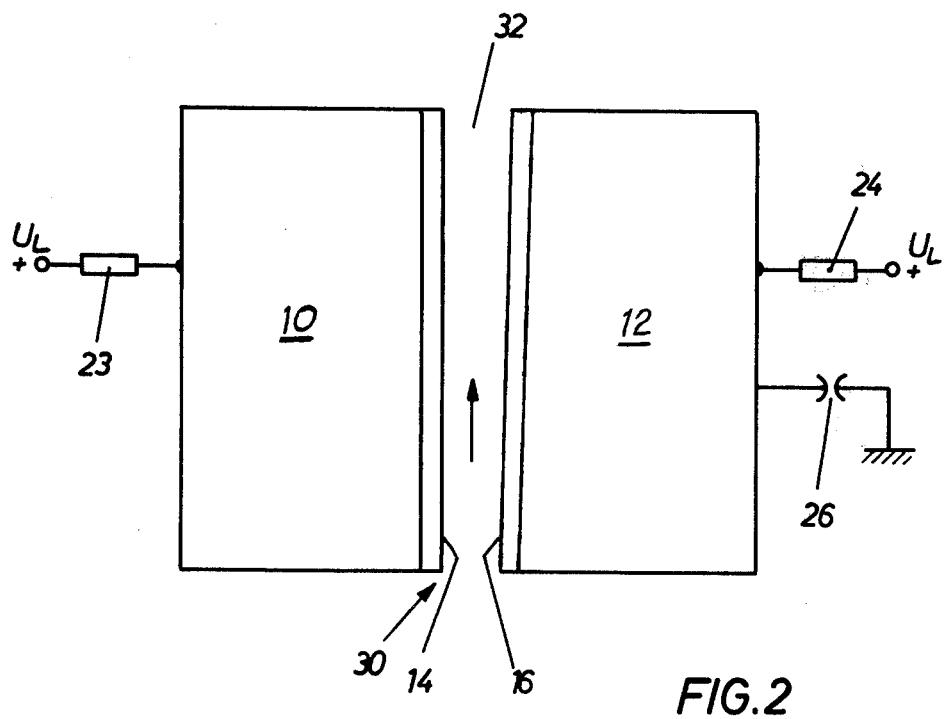

The invention will be described by way of example with reference to the accompanying drawings, wherein:

FIG. 1 is a simplified, highly schematic cross-sectional view through a laser in accordance with an embodiment of the invention; and FIG. 2 is a top view of the laser along the section line A—B of FIG. 1.

The laser has two electrodes 10, 12 in the form of elongated cast aluminum plates of about 5 mm thickness, 30 mm width and 50 cm length. The edges 14, 16 of the plates are pointed towards each other to form wedges, as seen in FIG. 1. The edges 14, 16 define between themselves a gap which forms the laser discharge channel or duct 18. A thin insulating foil 19, 20 is located above each one of the laser plates. These foils may, for example, be of polyester and have a thickness of about 0.2 mm. Counter electrodes 21, 22 are placed at the other sides of foils 19, 20. The counter electrodes 21, 22 extend over the entire width of the laser electrodes 10, 12 and form a capacitor with each one of the electrodes 10, 12. The counter electrode plates 21, 22 also may be aluminum plates of about 5 mm thickness. They are connected to ground or chassis of the system. The electrodes 10, 12 are connected to a source of high voltage $+U_L$ of, for example, $+8$ kV to $+10$ kV by resistors 23, 24 which, for example, may have a resistance value in the order of $10^8$ ohms. The source $+U_L$ is not shown in detail and may be any suitable high-voltage source.

Electrode 12 is connected to ground or chassis through a triggered spark gap 26. The triggered spark gap 26 is controlled in known form, and will have a discharge or breakdown voltage which is less than the voltage $U_L$.

The triggered gap 26 as well as the electrode assembly described are located in a common vessel 28. Vessel 28 includes a gaseous medium capable of being stimulated to emit radiation, for example nitrogen. The vessel 28 is not strictly necessary if the gaseous medium is the nitrogen in atmospheric air, under atmospheric pressure. Vessel 28 can be constructed to be pressure-resistant, and be connected to a source of gas under pressure, not shown. The pressurized gas supply source preferably provides gas under a pressure which is adjustable and controllable. A duct (not shown) and sealed to the pressure vessel can lead to the controllable gas pressure source.

In accordance with the present invention, the electric field strength and thus the formative time lag of the gaseous medium between the edges 14, 16 of electrodes 10, 12 uniformly and monotonically gradually increases from the lower side to the upper side. In accordance with the illustrated example, the distance between the facing edges 14, 16 of the electrodes along the length of the laser channel 18 monotonically increases from one end of the edges up to the other. In the example of FIG. 2, the electrode distance at the end 30 may, for example, be about 0.8 mm, whereas at the upper end 32 it will be 1.0 mm.

Operation: Electrodes 10, 12 are charged over the resistors 23, 24 to the voltage of source $U_L$. When the field across gap 26 is so high that gap 26 breaks down, overcoming the resistance to breakdown, i.e. when the voltage exceeds the breakdown strength of the gap, or is triggered externally, the capacitor formed by the electrode 12 on the one hand and counter electrodes 21, 22 on the other discharges first. The voltage between the electrodes 10, 12 rises rapidly and furnishes pumping energy. Due to the non-uniform distance between the edges 14, 16 along the length of the channel 18, a discharge between the electrodes will be initiated at the position of minimum gap width, that is, at the end 30 of the electrodes and the discharge state will then propagate in the direction of the arrow in FIG. 2 along the length of the laser channel 18. The geometric position of the connecting points of the charge resistors 23, 24, and, more importantly, the connection point of the gap 26 to electrode 12 can be selected at random and is without significance due to the relatively low voltage rise upon discharge of the capacitor 12-21, 22. The discharge state, propagating in the direction of the arrow through the laser channel 18 effects stimulation in the form of a travelling wave, which stimulates the medium to emission of super-radiation. The electric field strength decreases as the distance from the position of minimum gap width increases; the discharge formative time lag increases uniformly and monotonically. The laser radiation is emitted principally and primarily in the direction of the arrow and is much more intensive in that direction than in the opposite direction due to the travelling wave stimulation. The increase in intensity in emitted radiation from the end 32 is a multiple of that radiation emitted from end 30. Simultaneously, the wedge-shaped form of the electrode gap ensures that only a single laser radiation pulse is emitted for any one discharge.

Example: An electrode assembly was constructed with the dimensions above given; the stimulatable medium is the nitrogen in air under atmospheric pressure. The duration of the emitted laser radiation pulse is about 300 psec; propagation time of the discharge through a laser channel 18 of 50 cm length was about 1.7 nsec. As can be seen, a ratio of 5 of the two time periods characteristic for travelling wave stimulation effects substantial increase in energy of the emission.

The increase in width of the gap between the edges of the electrodes 14, 16 can be obtained in different ways. For example, one or both of the edges 14, 16 may be slightly bowed, that is, not be made straight. It is important, however, that the width of the gap, and hence the field strength increases from a position or point of minimum value along the length of the laser channel 18 or at least a portion thereof.

Various other arrangements can be used in order to change the field strength along the length of the laser channel 18 as the distance of the channel 18 increases from the predetermined breakdown point. These arrangements may be in lieu of or additionally to increasing the electrode distance. For example, a pressure gradient can be generated along the length of the laser ducts; an additional electric and/or magnetic field can be placed along the ducts. The dielectric strength of the emitting gas can be changed, for example by selective addition of an auxiliary foreign gas; or the radius of curvature of the edges of the electrodes along the duct, and hence the gradient of the field strength can be changed. In one example, the edges of the electrodes may have approximately the shape of a conical surface. The edges need not be wedge-shaped but may change from a sharp point to a more rounded one as the distance from the predetermined breakdown point increases.

The change in distance between the edges 14, 16 of the electrodes (FIG. 2), that is, the angle of the wedge formed by the gap between the electrodes, can be varied within suitable limits and is not restricted to the example given above. The change can readily be determined empirically to provide for optimum operation; it may vary, for example, between 0.04 and 0.1% of the length of the gap from the ends 30 to 32 of the gap.

Various changes and modifications may be made within the scope of the inventive concept.

If an auxiliary gas is to be introduced between the electrodes then, for example, the electrodes may be penetrated by ducts at selected positions for introduction of the auxiliary gas; or, the electrodes may be formed by means of pointed needles located adjacent each other. Additional gas can be introduced in the gaps between adjacently located needles.

We claim:

1. A laser having a pair of elongated electrode means located in a common plane and separated from each other by an elongated gap forming a laser channel;

a gaseous medium capable of being stimulated to emit radiation by laser action in said gap;

pumping means, coupled to said electrode means, for initiating a gas discharge between the electrode means across the gap therebetween at a predetermined position along the length of the gap such that a discharge state will travel along the gap and form a region of stimulated gas travelling along said gap;

said pumping means producing an electric field along the gap just prior to initiating the gas discharge, having an electric field strength which decreases uniformly and monotonically as the distance from said predetermined position increases, such that the discharge formative lag time increases uniformly and monotonically as the distance from said predetermined position increases.

2. Laser according to claim 1, wherein the electrode means have facing edges, the gap forming the laser channel being defined by the spacing of said edges, said edges monotonically and uniformly diverging from a minimum gap distance at said predetermined position for at least a portion of the length of the gap.

3. Laser according to claim 1, wherein the edges are straight and diverge from one end of the electrode means to the other end thereof.

4. Laser according to claim 1, wherein the electrode means are formed with facing edges having monotonically varying radii of curvature of the edges adjacent the gap forming the laser channel to change the electric field strength and thus the discharge formative lag time of the gap uniformly and monotonically.

5. Laser according to claim 1, wherein the means varying the formative time lag comprises an electric field applied along the length of the gap which has its greatest strength adjacent said predetermined position.

6. Laser according to claim 1, wherein the gaseous medium capable of stimulation is air.

7. Laser according to claim 1, further comprising a vessel surrounding the electrode means, the edges of the electrode means defining the laser channel; said vessel further comprising a spark gap connected to trigger a gas discharge between the electrode means, so that the pressure in the spark gap and in the gap between the electrode means will be uniform.

* * * * *